United States Patent Office 3,439,874
Patented Apr. 22, 1969

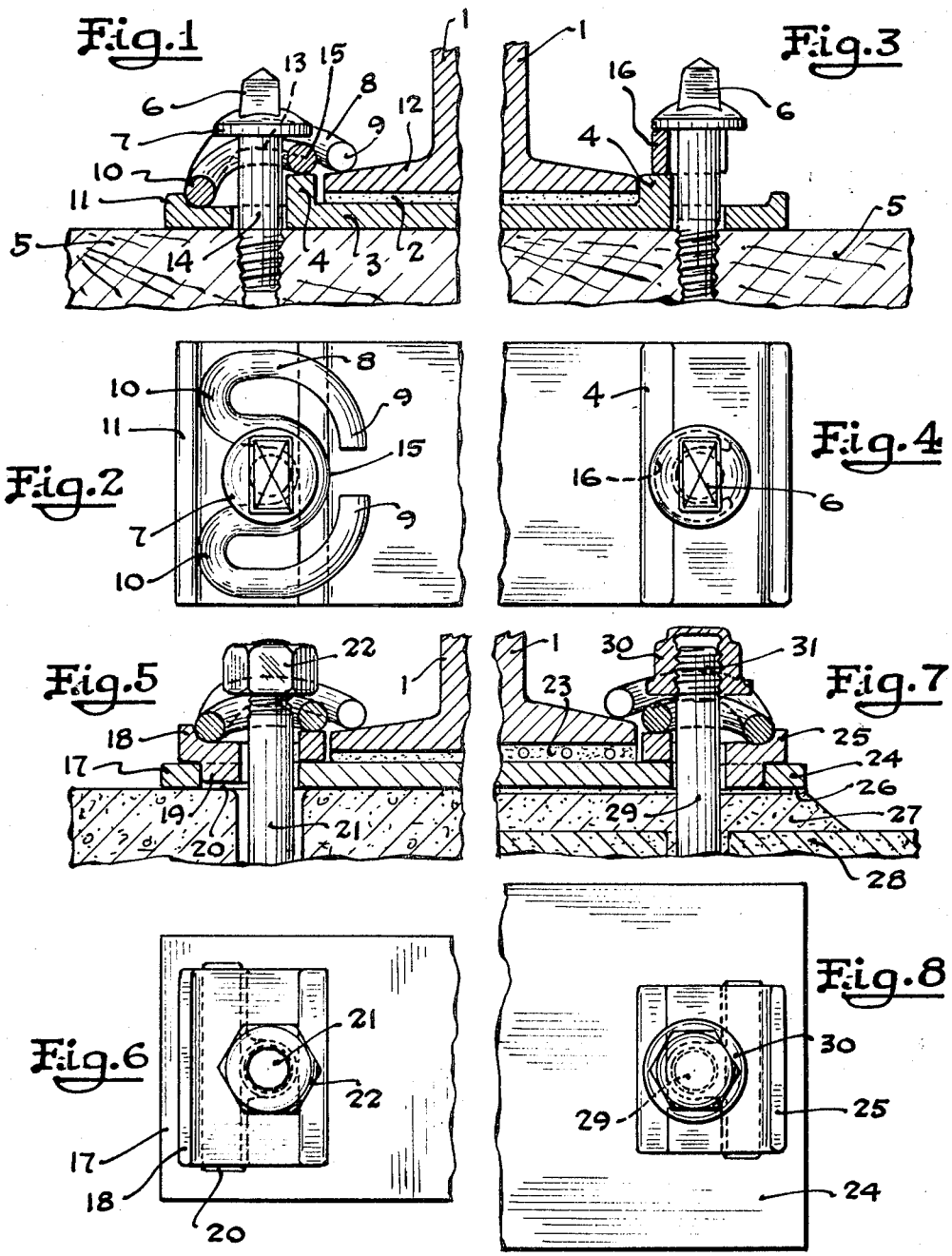

3,439,874
RAIL FASTENING ARRANGEMENT
Hermann Oskar Meier, Arcisstrasse 21, Munich, Germany; Helen Joan Mary Meier, nee James, Eva Marianne Meier, Wolfgang Alexander Meier, and Manfred Julian Meier, all of Munich, Germany, heirs of said Hermann Oskar Meier, deceased
Filed Oct. 27, 1967, Ser. No. 678,762
Claims priority, application Germany, Oct. 29, 1966, M 71,505
Int. Cl. E01b 9/00, 13/00, 21/04
U.S. Cl. 238—349
9 Claims

ABSTRACT OF THE DISCLOSURE

A rail fastening attachment for fastening rails on ties and the like employing a flexible rod-like clamp member in a substantially W-shape with opposing end terminal portions for contact with the rail and a central portion for contact with a projection on the clamp member and with a screw type fastening means.

---

This invention relates to a rail fastening arrangement, which comprises a fastening screw which retains an elastic clamp in the shape of a W, which preferably is constructed of rod steel. The center portion of said W-shaped clamp circumscribes the shaft of said fastening screw and controls the tensioning movement when the screw is tightened. The free ends of the said clamp press down upon the rail base and the clasp is secured against rotational dislocation.

These types of rail fastening means have in general already been known. Those known in the art provide an elastic clamp from rod steel, the leg portions of which are approximately placed in the horizontal plane. The clamp yoke is combined with a fastening screw, which penetrates through a small guide plate. When this unit is tightened, the pressure to the fastening screw substantially directed eccentrically, which causes the bending of the screw shaft and an undesirable deformation in the wooden pegs, or in the wooden railroad ties, respectively. In view of the fact that the U-shaped center portion of the clamp does not provide any vertical spring tension, it will be obvious that even if the screw nut is only raised slightly, it will cause the loosening of the guide plate.

Other rail fastening systems are known in which resilient clamps are employed with their backward bent terminals laterally fastened or inserted into headpieces, which can be penetrated by fastening screws. The curvatures of these clamps also are in the horizontal plane and therefore these headpieces serve also as tie rods. This arrangement, like the preceding one described above, has the same above set out disadvantages, so that here also the loosening up of the headpieces cannot be avoided in the same manner as the loosening of the guide plate in the preceding arrangement could not be avoided. With respect to the above described state of the art, the present invention provides for a solution of the problem, namely by avoiding the disadvantages inherent in the conventional devices. A rail fastening arrangement of the initially described type is provided, which is of simple construction and can be easily installed or disassembled and comprises few, simple, individual parts, is economical to produce and to maintain and dependable in the bracing of the rail and the rail guiding parts. By means of the present invention the deformation of the fastening screws is avoided because the fastening screws are not subjected to eccentric forces, and the arrangement of the present invention is uniformly applicable and usable.

The solution of the given problem is, in accordance with the present invention, accomplished by providing for positioning either under the head or the nut of the fastening screws a clamp center-portion, which is arched and has a convex shape. In the center of the clamp arch the screw axis center is located and assures thus that the force vector of the screw remains centered. This assures also that the screw will exclusively respond to tensioning only and bending or deformation thereof is avoided.

The arching of the clamp causes the central spring portion thereof, which lies between the two reversed portions of the clamp, to be rigidified. This rigidification permits a substantial increase in the applicable tightening force, applied through the fastening screw. On the other hand, by lengthening the central spring portion, one obtains a substantially greater tensioning path, which is sufficient to allow to retain the fastening screw continuously under very high tensions. Thus a maximum and continuous bracing of the guide plate or the like under the rail is assured and this makes it possible to insert lateral guide ribs into the tie surfaces without hesitation.

The elastic clamp is shaped into the most desirable shape by bending its free ends towards each other so that they face each other. The spring diagram obtained in this manner is particularly desirable because with a rod diameter of only 30 mm. the pressure, which can be exerted upon the rail by both ends, can amount to 1,000 kp. and the required spring path is only 10.5 mm. The extremely satisfactory force vector diagram provides for sufficient tensioning pressure even if substantial plastic deformations occur in the elastic intermediate layer below the rail or when the guide plates are pressed deeply down into the wooden tie surfaces. Tightening of the screws will only be required in intervals of substantial length of time.

A further advantage of the type of shaping proposed, resides in that the terminal ends of the clamp are directed to approach towards the tie center, so that if tipping of the rails on the ties occurs, only relatively small movements between the rails and clamp terminals take place, which will not affect the relationship and will not cause a substantial degree of abrasion. The tensioning of the elastic clamp is accomplished by compressing the convex center portion of the clamp and in this manner the danger of static over-stressing is avoided by a limitation of the spring path, that means by providing for the center portion of the clamp to contact a rib of the support layer after it has traversed a set path length.

When wooden ties are employed the support is suitably a simple base plate, preferably a rolled metal product, which has inexpensively produced perforations for the shaft of the screws. The internal ribs of this plate are to serve to guide the rail and also to define the upper limitation of the spring path. The outer rods guarantee a support, which is adapted to resist successfully rotational misalignment of the elastic clamps. The use of any suitable fastening screw is possible. The plate attachments of the ties are preferably already accomplished in the factory where one inserts a removable temporary washer in place of the clamp under the head of the screw. This arrangement will simplify substantially the later positioning of the rail between the ribs of the plate.

If concrete ties are employed one can use the same type of support, namely the rib plates. It might be desirable to enlarge the area used under the rail for the elastic intermediate support. When concrete ties are employed, it is advisable to use lateral guide rods, this will reduce the cost of the arrangement. These lateral guide rods are subject matter of a separate patent application, which has already been filed. If economical difficulties arise due to the rolling or forging operations required for the guide plates for specific rail profiles, it is possible to use a composite support plate, which consists of a base plate "flat iron with stamped holes" and special lateral guide ribs which point downwardly and interengage into prepared notches on the base plate. A firm engagement of the arrangement is accomplished through firmly fitting screws, which assures that the inserted guide ribs remain constantly tightly positioned.

This construction is also recommended when the rails are directly fastened on to the floors of tunnel or bridges. In this arrangement the base plate should be wide and the inserted guide ribs quite narrow because on these types of surfaces no distortion of the rails can occur. When, because of the settling of the tunnel-floor or bridge-surface the rail must be laterally adjusted, it is possible to make such a correction simply with the use of new guide ribs. The rail height or level can likewise be adjusted by the insertion of thicker intermediate layers or by raising the balancing layer. For steel ties the construction can be most advantageously arranged by preparing the tie surface for the insertion of the fastening screws and the holding of the clamps and guide ribs providing a lateral upward elevation in its design.

Several examples illustrating several rail fastening means in accordance with the present invention are shown in the accompanying drawings, wherein FIGURES 1, 3, 5 and 7 are views in vertical section and FIGURES 2, 4, 6 and 8 are respective top views as follows:

FIGURES 1 to 4 show a rail fastening system with its guide plate mounted upon a wooden tie. In FIGURES 1 and 2 the construction illustrates a completely assembled unit and FIGURES 3 and 4 the same unit prior to complete installation as it is shipped.

In FIGURES 5 to 8 a rail fastening arrangement is shown in which a combined support plate is employed, which is mounted on a concrete tie (FIGURES 5 and 6), or on a stone or brick support (FIGURES 7 and 8).

Under the rail 1 and the elastic intermediate layer 2, there is positioned on the wooden ties 5 the support plate 3, which is provided with ribs 4, which are laterally elevated along the rail. The fastening of the rail on the tie is accomplished by means of the tie screw 6, which presses with the screw head plate 7, on the elastic clamp made of rod steel. The latter 8, is designed in a W-shape with inwardly bent terminal portions 9, which each press against the rail base 12 and whose angular loops, as shown at 10, press against the base plate and support themselves against the base plate's outer ribs 11, in such manner, that rotational dislocation is avoided. The center portion 15 of the clamp is located under the screw head and is convex 13 and circumscribes the screw shaft 14. When the screw is tightened the elevated center-portion 15 is limited in its movement by the rib 4 of the support plate. This limitation of its path of travel will avoid a straining of the clamp.

On the other hand, the support plate in this manner is sufficiently firmly fastened to the tie. The convex elevation of the center-portion of the clamp under the screw-head also assures that a central force direction for the fastening screw exists and the screw is thus prevented from being subjected to an additional and damaging bending tension.

As shipped and supplied, the support plate is already mounted upon the tie. This will permit the easy positioning of the rail between the ribs of the plate making this operation very simple. So that the tie screw may only have to be turned for a quarter rotation, and this is desirable in order to protect the tie wood in the threaded area, it is best to provide under the screwhead a laterally removable suitably high spacer 16, which is formed from a thin metal or from any other inexpensively produced material, which will transfer the pressure of the fastening screw to the plate. By slightly elevating the tie screw, the removal of the inserted spacer is accomplished and the elastic clamp can be inserted and after having been inserted it is tensioned. Where ribbed plates are not suitable for a specific rail profile, or are not available for specific rail profiles, an inexpensive rail fastening means can be constructed, which comprises a composite support plate in accordance with FIGURES 5 and 6. The drawings particularly illustrate an arrangement for concrete ties. The arrangement as shown, comprises a base plate 17 (which is a flat piece of steel with cold stamped holes) and specific lateral guide ribs 18. Downwardly positioned ribs or the like 19, engage corresponding notches 20 provided in the base plate for support. The bolts 21 with the nuts 22 may be employed for firm and permanent fastening in the concrete tie body.

The construction in accordance with FIGURES 7 and 8 is particularly suitable for the direct attachment of rails on the floors of tunnels or bridges. A specific elastic intermediate layer under the rail 23 guarantees sufficient resiliency. The base plate 24 can be broadened and enlarged so that a better distribution of the pressure is accomplished and the guide ribs 25 are kept very small or narrow as no danger exists that the rails will be distorted. Any possible settling of the tunnel or bridge floor can be counteracted by the insertion of a thicker intermediate layer 26 or by elevating or raising the balancing layer 27, which is positioned on a concrete or brick surface 28. A correction for lateral shifting is accomplished by the substitution of other suitably shaped ribbed guides. Suitably, the fastening bolts 29 are adhered with adhesive to the brick work 28 and specific flange nuts 30 are employed so that the screw threads 31 are suitably protected.

Others may practice the invention in any of the numerous ways which will be suggested by this disclosure to one skilled in the art by employing one or more of the novel features disclosed or equivalents thereof.

I claim:

1. A flexible rod like attachment assembly for securing rails to ties and the like, said attachment assembly comprising a clamp member, a substantially W-shaped body section forming said clamp member with substantially opposing open end terminal portions, a convex flexible central portion in said body section, an opening in said central portion for accommodating a screw type fastening means, a plate member providing a lateral abutment surface for said rail, a rib portion on said plate for contact with both outer loop portions of said clamp member, said clamp member adapted to extend from said rib to engage the base of said rail and to be resiliently held by said fastening means passing through said inner loop to urge said clamp member against said plate and against the base of the rail.

2. The attachment assembly as defined in claim 1 wherein said body section of said clamp member is curved substantially throughout.

3. A rail attachment assembly comprising a clamp member, a substantially W-shaped body section forming said clamp member with substantially opposing open end terminal portions, a convex flexible central portion in said body section, an opening in said central portion for accommodating a screw type fastening means, a plate member providing a lateral abutment surface for said rail, a rib portion on said plate for contact with outer loop portions of said flexible clamp member, a projecting portion on said plate for contact with an inner loop portion of said clamp member, said clamp member adapted to extend from said rib to the base of said rail, said fastening means passing through said inner loop and said plate to urge said clamp member against said rib portion and said projecting portion on said plate and against the rail.

4. The rail attachment assembly as defined in claim 3 wherein the projecting portion of said plate for contact with the inner loop portion of the clamp member and the lateral abutment surface for said rail are formed in a unitary rib.

5. The rail attachment assembly as defined in claim 3 wherein said plate member has two opposing lateral abutment surfaces and a substantially flat portion for positioning beneath the rail.

6. The rail attachment assembly as defined in claim 3 wherein said plate member further includes another rib portion on a side opposite that for contact with said clamp member, said rail attachment still further including a second plate member for positioning beneath a rail and an opening in said second plate member for accommodating said other rib in the first mentioned plate member.

7. The rail attachment assembly as defined in claim 3 wherein said projecting portion on said plate extends to a higher elevation than said rib portion.

8. The rail attachment assembly as defined in claim 5 wherein said securing means is especially adapted for engagement with a wooden tie.

9. The rail attachment assembly as defined in claim 6 wherein said securing means is especially adapted for engaging a concrete or brick and mortar structure.

References Cited

FOREIGN PATENTS

| | | |
|---|---|---|
| 222,978 | 7/1959 | Australia. |
| 189,213 | 3/1957 | Austria. |
| 1,200,177 | 6/1959 | France. |
| 498,016 | 1/1939 | Great Britain. |
| 576,478 | 5/1958 | Italy. |

ARTHUR L. LA POINT, *Primary Examiner.*

R. A. BERTSCH, *Assistant Examiner.*